June 9, 1964 D. C. MEYERS 3,136,886

GRAPHICAL READOUT SYSTEM FOR RECORDS

Filed May 25, 1960 5 Sheets-Sheet 1

INVENTOR:
DOUGLAS C. MEYERS
BY: Theodore E. Bieber
HIS ATTORNEY

June 9, 1964 D. C. MEYERS 3,136,886

GRAPHICAL READOUT SYSTEM FOR RECORDS

Filed May 25, 1960 5 Sheets-Sheet 2

INVENTOR:
DOUGLAS C. MEYERS
BY Theodore E. Bieber
HIS ATTORNEY

INVENTOR:
DOUGLAS C. MEYERS
BY: Theodore E. Bieber
HIS ATTORNEY

GRAPHICAL READOUT SYSTEM FOR RECORDS

Filed May 25, 1960 5 Sheets-Sheet 4

INVENTOR:
DOUGLAS C. MEYERS
BY: Theodore E. Bieber
HIS ATTORNEY

June 9, 1964 D. C. MEYERS 3,136,886

GRAPHICAL READOUT SYSTEM FOR RECORDS

Filed May 25, 1960 5 Sheets-Sheet 5

INVENTOR:
DOUGLAS C. MEYERS
BY Theodore E. Bieber
HIS ATTORNEY 3,136,886

GRAPHICAL READOUT SYSTEM FOR RECORDS

Douglas C. Meyers, Metairie, La., assignor to Shell Oil Company, New York, N.Y., a corporation of Delaware Filed May 25, 1960, Ser. No. 31,606

5 Claims. (Cl. 235—61.9)

Figure 1:
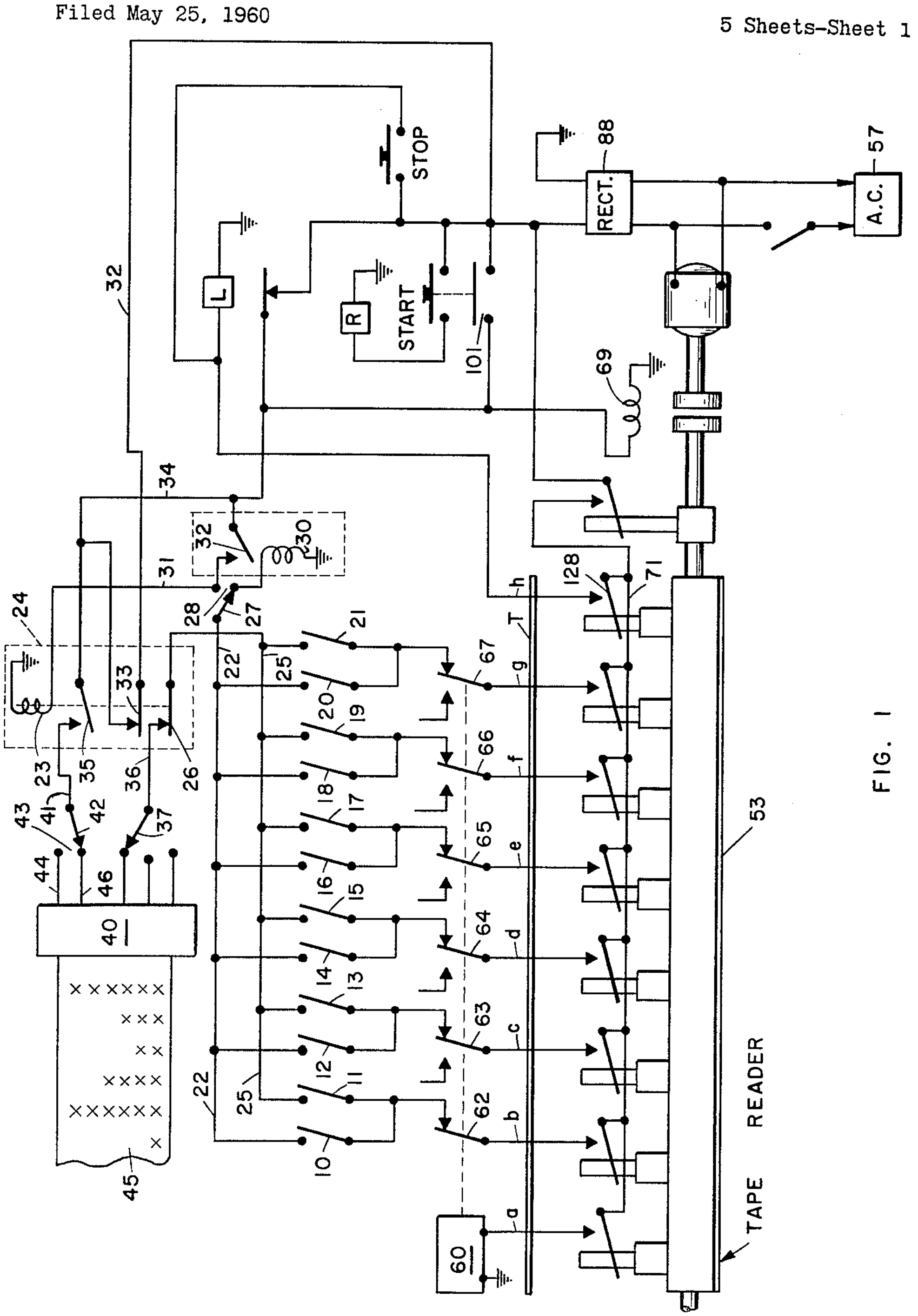
Figure 2A:
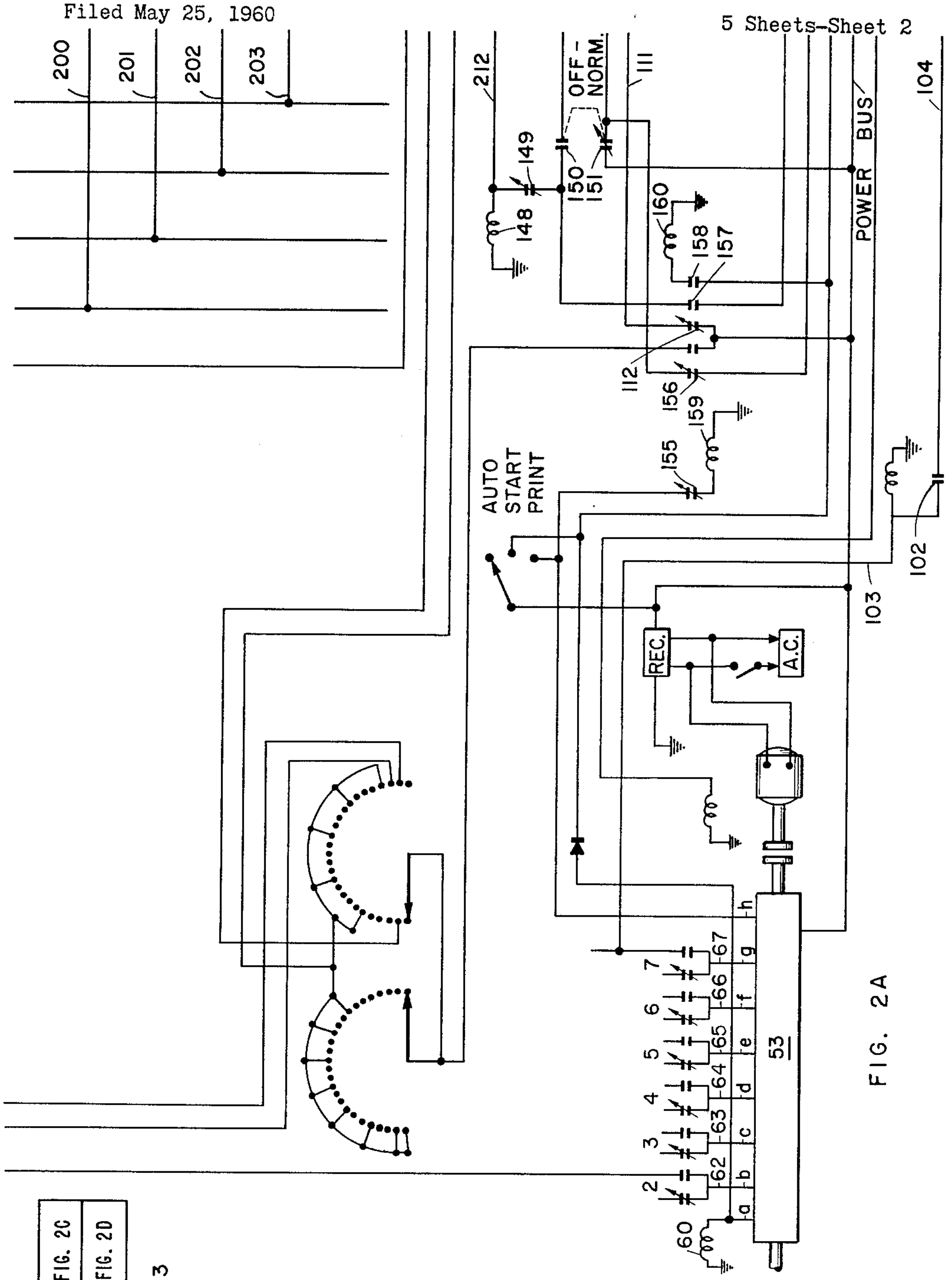

This invention relates to a means for graphically displaying the data contained on multi-channel records. More particularly, it relates to a means for graphically displaying data which is recorded in the form of machine-sensitive marks in a plurality of channels on a tape. The machine-sensitive marks indicate additive changes in the data and they may be read by passing the tape through a reader device which accumulates the total number of marks occurring in any particular channel.

The graphical display means of this invention is particularly adapted for use with the record reading devices described and illustrated in my copending patent application, Serial No. 799,722, filed March 16, 1959, and entitled "Readout System for Multi-Channel Records." The above application is incorporated by reference inasmuch as a considerable portion of the drawings of my prior application are duplicated in the present application with identical numbers being used to describe identical elements.

In the above-referenced application a readout system is described which is particularly useful when more than one item of data is recorded in the same channel. The data recorded in a particular channel can be either fixed or variable or any combination thereof thus permitting one to record a large amount of data utilizing a limited number of channels. The records are provided with separate identification channels in order to separate fixed data from variable data or two different groups of the same type of data. The data is recorded by means of machine-sensitive marks, more particularly by punched holes in the tape. The number of holes occurring in any channel are accumulated on separate totalizing devices with each channel being provided with two separate totalizing devices. One totalizing device accumulates the fixed data in the channel while the second accumulates the variable data.

At the end of a set data the above readout device stops and prints the totals accumulated by means of an electric typewriter. While this method gives an indication of the total data accumulated it will not give an indication of the variation in the data with respect to time. In any application, for example in the data recorded during the testing of oil wells, it is important to know the variation in data with respect to time in addition to the total data.

Accordingly, it is the principal object of this invention to provide a novel means whereby the data accumulated on are cord in the form of machine-sensitive marks may be automatically read, graphically displayed and the totals recorded.

It is a further object of the present invention to graphically plot the data recorded on a record in the form of machine-sensitive marks simultaneously with the reading of the record and at the end of each particular set of data to record the total data which is accumulated.

A still further object of the present invention is to provide a readout system which will indicate the total number of machine-sensitive marks which occur in each channel and separate the fixed data from the variable data where both are recorded in the same channel. In addition, the system will continually graph the changes in the variable data utilizing the same means used for printing out the accumulated totals.

The above objects and advantages of this invention are obtained by utilizing the same tape reading and accumulating means described in the above-referenced application. In addition to the system described, means are provided for indicating whenever a predetermined number of machine-sensitive marks occur in a particular channel whose quantity is to be plotted along one of the axis of the graph. The quantity chosen is usually time and the predetermined number of marks are chosen to indicate increments of time, for example, $\frac{1}{10}$th of an hour. When the predetermined number of marks are accumulated, the tape reading mechanism is stopped. The totalizing device accumulating the data which is to be plotted on the other axis of the graph is scanned and a typewriter carriage spaced horizontally the number of spaces corresponding to the accumulated totals. When the typewriter carriage is properly spaced a distinctive character is typed. After the mark representing the accumulated data is typed the typewriter carriage is returned to its initial position and the record advanced one line. The data readout mechanism is then restarted and continues to read until the predetermined number of marks are again accumulated in the time channel at which time the machine is again stopped and the data graphically plotted. At the end of the data the readout mechanism is stopped and the total data accumulated in each channel is printed out by the typewriter in the same manner as was described and illustrated in the above-referenced application.

Figure 3:
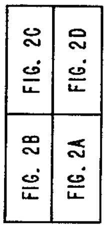

The above objects and advantages of this invention will be more easily understood from the following detailed description of a preferred embodiment when taken in conjunction with the attached drawing in which:

FIGURE 1 illustrates this invention when applied to a tape reading mechanism shown and described in FIGURE 1 of the referenced application;

FIGURES 2*a*, 2*b*, 2*c* and 2*d* illustrate this invention applied to the tape reading mechanism shown and described in FIGURE 5 of the above-referenced application; and, FIGURE 3 illustrates how FIGURES 2*a*, 2*b*, 2*c* and 2*d* are assembled to form a single drawing.

Referring to FIGURE 1, there is shown a tape reading machine 53 which is identical to the tape reading machine disclosed in the above-referenced application. This tape reading machine reads a record T and indicates the data occurring in the form of machine-sensitive marks in channels *a–h*. The individual channels *b–g* are connected to the switches 62–67 and to a second set of switches 10–21. This permits the selection of the data in any particular channel for plotting along the vertical axis of the graph and the data in any other channel for plotting along the horizontal axis. The switches 11, 13, 15, 17, 19 and 21 are all connected to a common lead 25 which in turn is connected to a set of contacts 26 on a relay 24. The switches 10, 12, 14, 16, 18 and 20 are connected to a common lead 22 which is connected to the arm 27 of a two position switch 28. One position on the switch 27 couples the lead 22 to the solenoid 30 of a pulse counting relay while the other position couples the lead 22 to the solenoid 23 of relay 24 by means of a lead 31. One side of the contacts 32 of the pulse counting relay are coupled by means of a lead 34 to the power supply 88 while the other side is coupled to the lead 31. The pulse counting relay should be of the type that closes after receiving a predetermined number of pulses and there opens and repeats the cycle. A second set of contacts 33 on the relay 24 are coupled by means of a lead 32 to the power supply 88 while a third set of contacts 35 on the relay 24 are coupled to the stationary contact of the contacts 33 and by means of a lead 34 to the power supply 88. The stationary contact 36 of the contacts 26 is connected to the arm 37 of a multiple position switch which permits the contacts 26 to be connected to the operating solenoids of three different characters on the typewriter 40 as shown in FIGURE 1. These characters may be chosen from any available, for example, X, O and a period. The stationary contact of the contacts 35 is connected by means of a lead 41 to the arm 42 of a two position selector switch 43. One position on the switch 43 couples the fixed contact to the carriage return lead 44 of the typewriter 40 while the other position couples the fixed contact to the line advance lead 46 of the typewriter.

When the above-described system is operated one must first select the two variables which are to be plotted. Normally, one of the variables will be time which is recorded in channel *g* and is preferably plotted on the vertical scale of the graph. Accordingly, the switch 20 should be closed in order to connect the pulses from the channel *g* to the selecting switch 28. If one desires to plot only the total data in a selected channel with respect to time the arm 27 should be moved to the opposite position from that shown in FIGURE 1. This will supply the time pulses directly to the solenoid 23 where they may be used to actuate the line advance of the typewriter by proper positioning of selector switch 43. The other variable may be selected from the channels *b–f* by closing any one of the switches 11, 13, 15, 17 and 19. This will apply the pulses from the other channels through the normally closed contacts 26 and the arm 37 to actuate the typewriter to print the character selected. Whenever a machine-sensitive mark occurs in the time channel *g* a pulse will be passed to the solenoid 23 to close the contacts 35 and open the contacts 26 and 33 of the relay 24. As explained above, the contacts 35 are connected to the line advance of the typewriter 30 by the proper positioning of selector switch 43. Thus for each time mark in channel *g* the typewriter will advance the record one line. Simultaneously, whenever marks occur in the selected channel *b–f* the typewriter 40 will print the selected character and space the carriage one space horizontally. The combination of these two operations will result in the graphical display of the accumulative data recorded in the selected channel *b–f* with respect to time. If no pulses occur in the channel selected during the receipt of a time pulse the line advance will be actuated and no character will appear on the line of the record 45. This would indicate that the variable being plotted maintained a constant value for this period.

Instead of plotting the accumulated data in a selected channel with respect to time, one can also plot the rate of change in the selected data with respect to time. When it is desired to plot the rate of change in the selected data the selector switches 28 and 43 are positioned as shown in FIGURE 1. In this position the carriage will be returned and the record 45 advanced one line upon the occurrence of a predetermined number of time marks, for example 10. The data from the selected channel would be recorded as a line of characters between the carriage return cycles as shown on the record 45. By drawing a continuous curve through the points represented by the last character in each line one obtains a curve representing the change in rate of the selected variable. For most applications one can visually scan the record obtained without actually drawing a line connecting the points.

The remainder of the system shown in FIGURE 1 operates in substantially the same manner as that described in the referenced application. For the purpose of clarity the accumulating devices for the various channels shown in FIGURE 1 of the previous application are not shown or described.

Referring now to FIGURE 2, there is shown a record reading machine which is capable of not only reading the record and printing out the total data accumulated in any channel but in addition one which will graphically plot the data occurring in selected channels as a function of time. Large portions of the drawing shown in FIGURE 2 are duplicates of the drawing shown in the previous application and identical elements are assigned the same identifying numbers as used in the previous application.

The tape reader 53 with the selecting relay 60 having contacts 62–67 is identical with the tape reader shown in the previous application. The latching relay 159 and 160 having contacts 155, 156, 157 and 158 is also identical with the previous latching relay and the same applies to the latching relay 163–164 shown in FIGURES 2*a* and 2*d*. Thus, the record reader will operate in the same manner as described previously and the pulses occurring in a particular channel, for example, channel *b*, will be accumulated on the accumulating device 138 of FIGURE 2*b*. One-half of the device 138 accumulates units while the remaining half accumulates the tens portion of the pulses. The device 138 accumulates only the variable data which occurs in channel *b*, the accumulators for the fixed data or the preset data are omitted from the drawing. The accumulating devices for the remaining channels *c–g* on the tape reader 53 are omitted from FIGURE 2 in order to simplify the drawing. These accumulating devices are exactly the same as the accumulator 138 described above.

The graphical plotting system of this invention permits one to graphically plot the data occurring in any channel *b–f* which is selected on the same automatic typewriter which is used for printing out the data accumulated on the device 138. To accomplish this result the pulses occurring in the time channel *h* are supplied by a lead 103 to a relay 102 which closes only after receiving a predetermined number of pulses. For example, after receiving ten pulses the relay 102 closes which assuming that a time mark was recorded for each 100th of an hour in the original record means that the selected data is graphically plotted for each tenth of an hour interval in the original test. Of course, tape reading speed and plotting is not related to the speed of the original record inasmuch as the time marks are used to denote time and not the record speed. The contacts of the relay 102 are connected by a lead 104 through a normally closed set of contacts 107 to the solenoid 105 of a relay 106. The relay 106 is disposed to stop the tape reader by interrupting the power supplied to the tape reader clutch through the opening of the normally closed contacts 108.

The normally open contacts 110 of relay 106 are closed by the actuation of the relay 106 and supply power to the lead 113. The lead 113 supplies power to the various remaining portions of the equipment including the wiper arms 114–117 of the levels 3, 4, 5 and 6 of stepping switch A, respectively. Power is also supplied from lead 113 to actuate relays 119, 122 and 124. Actuation of the relay 119 opens a series of normally closed contacts 121 which disconnect the tens unit of the accumulator 138 from the electric typewriter 120. Actuation of the relay 122 reverses the contacts 123 from the position shown in the attached drawing and couples the individual positions on the unit portion of the accumulator 138 to the individual unit positions on level 3 of switch A. The movable wiper arm of the unit portion of the accumulator 138 is coupled to the contacts 125 of the relay 124. The contacts 125 are shown in their normal position but when the relay 124 is actuated by the closing of the contacts 110 of the relay 106 they, of course, will be reversed from the position shown. The upper contact of the contacts 125 is coupled to the contacts 131 of the relay 130 and contacts 133 of relay 132, respectively, by a lead 126. The contact 133 is coupled by lead 134 to both the solenoid of a relay 142 and the contacts 143 of the relay 142. The relay 132 is closed and latched whenever a pulse is received by the accumulator 138. This insures that if no data as represented by marks on the record is accumulated on 138 during the time interval selected the graphical readout system will not plot the data previously accumulated. The contacts 143 in turn are coupled by a lead 147 to the character selected on the typewriter 120 for use in printing the graphical data. A second set of contacts 144 on the relay 142 are coupled by means of a lead 152 to an interruptor switch 210 and through it to the power lead 113. The normally closed contacts 144 are also coupled to the solenoid of the relay 145 and the contacts 146 of the relay 145. The contacts 146 in turn are coupled by a lead 153 to the spacing solenoid on the typewriter 120.

Figure 2B:
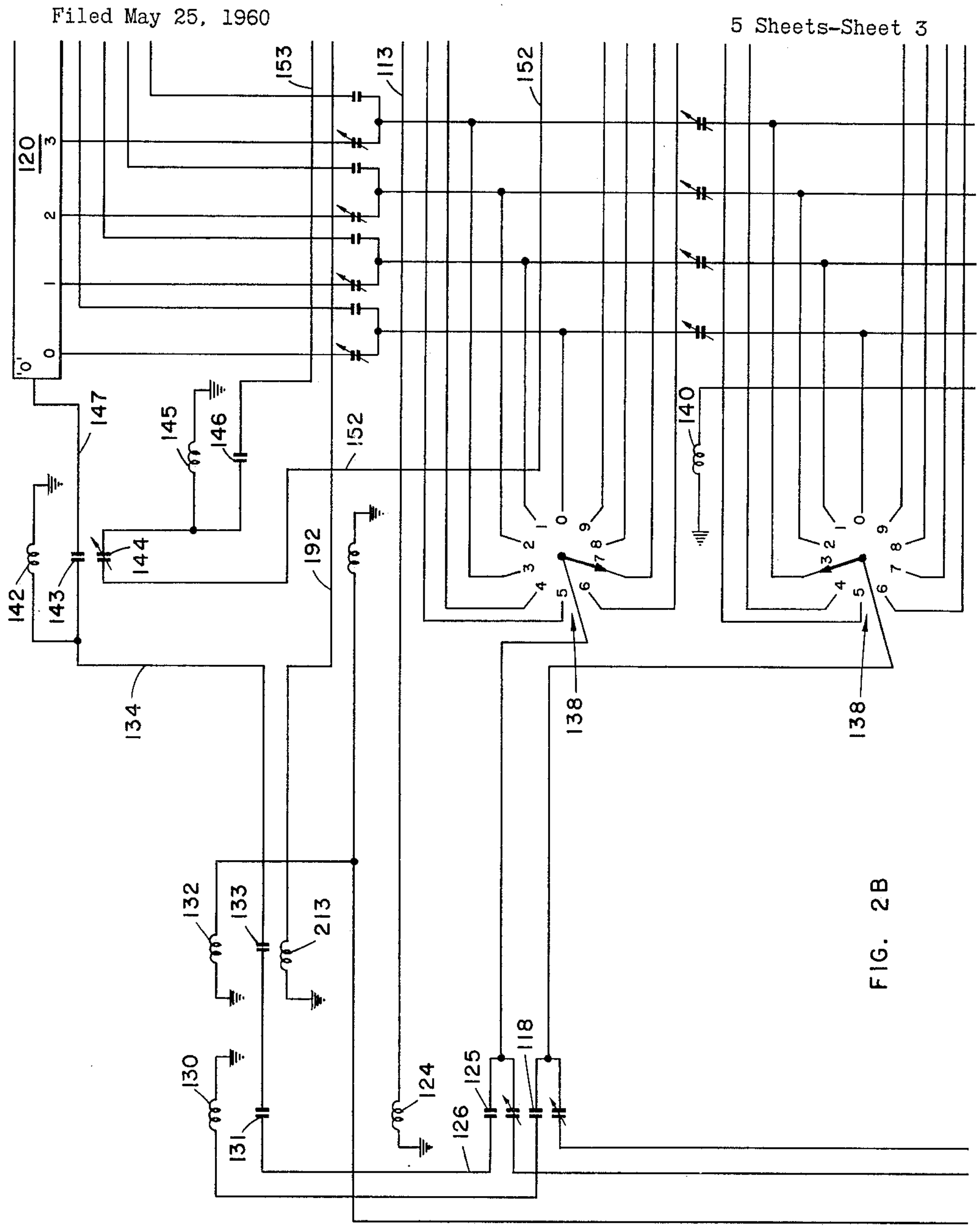
Figure 2C:
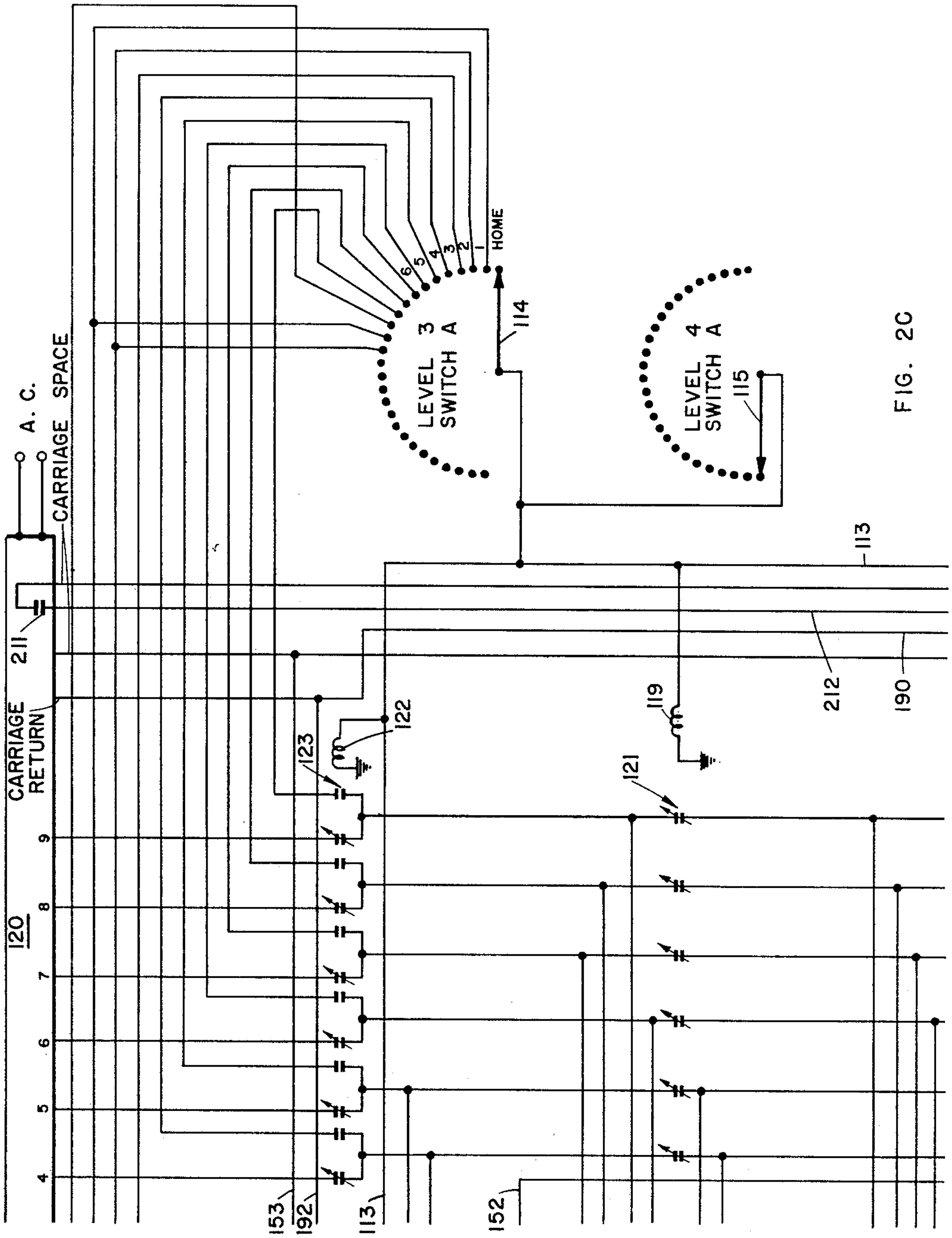
Figure 2D:
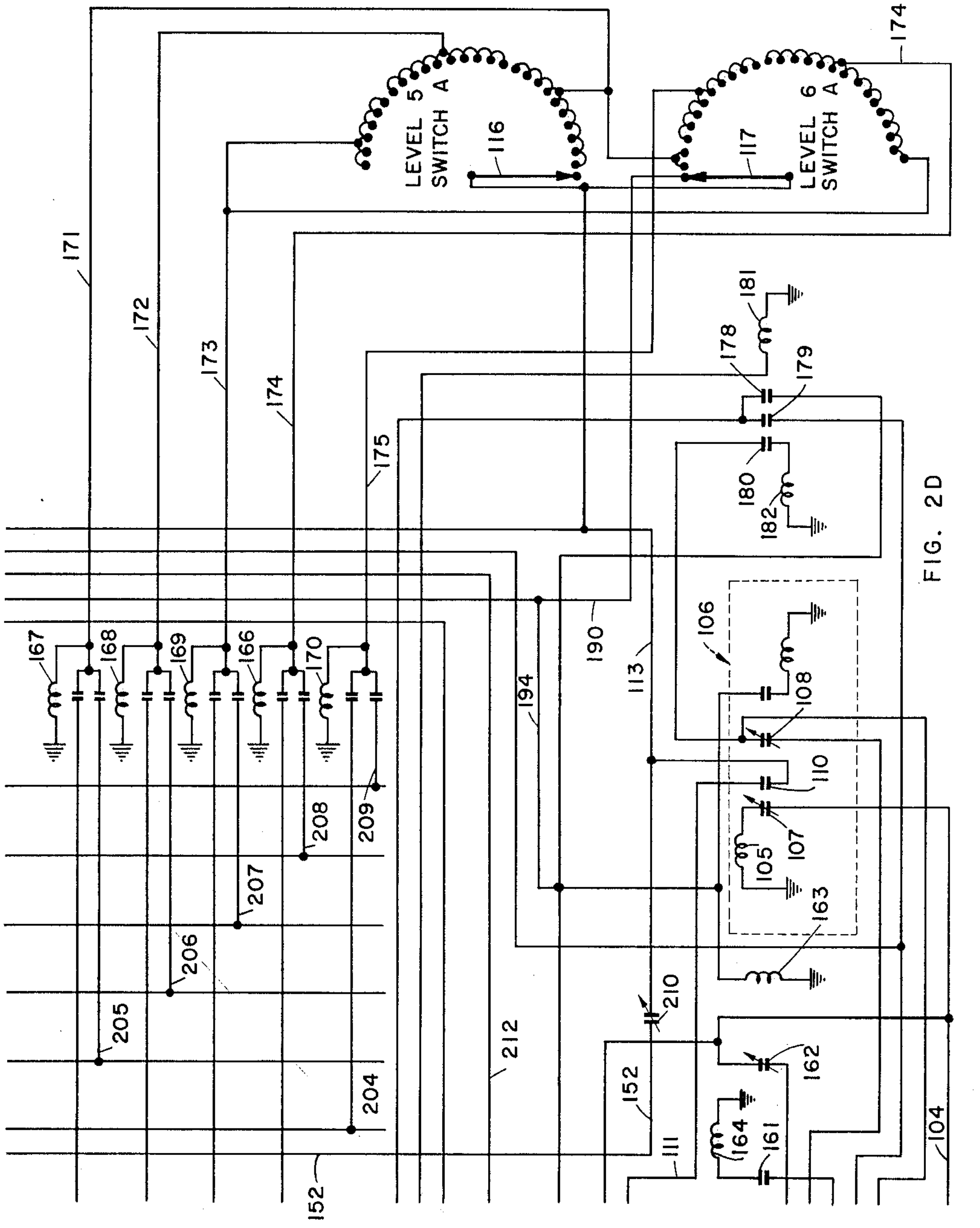

The levels 5 and 6 of swich A contain a total of 50 positions plus a home or return position as shown in FIGURE 2*d*. As shown in the attached drawing, the levels 5 and 6 have been returned to the home position which in turn returns the typewriter carriage to its initial or extreme right position. The 50 positions on these two levels are divided into 5 groups of 10 each, with each group being connected to one of the relays 166 to 170. The first group on level 5 is connected by a lead 171 to the relay 167 and is used to supply power through its closed contacts to the zero or 50 position on the tens accumulating portion of the accumulator 138. The next group of 10 is connected by the lead 172 to the relay 168 and supply power to the 10 and 60 unit level while the remaining 6 positions on level 5 and the first 4 positions on level 6 are connected by means of a lead 173 to the relay 169 and supply power to the 20 and 70 units. The remaining groups of 10 positions are connected by leads 174 and 175 to the relays 166 and 170 and supply power to the 30–80 and the 40–90 units, respectively. The relays 166–170 are connected by suitable leads 200–209 to the appropriate positions on the tens unit accumulator of the accumulator 138.

When the above system is operated as explained above the relay 102 will close after having received a predetermined number of pulses from the channel *h*. Any number of pulses may be chosen, for example 10 pulses, the value depending upon the desired time scale on the graphical display. When the relay 102 closes it will actuate the coil 105 of the relay 106 which in turn will stop the tape reader and supply power to the various elements of the graphical display system. This will also supply power to the normally closed contacts 144 of relay 142 to actuate the relay 145 and thus supply power through the closed contacts 146 and lead 153 to cause the typewriter to space horizontally one position. When the typewriter spaces it will close the contacts 211 in the typewriter which will energize the solenoid 148 of the switch A by means of lead 212. When the switch A is energized it will move the wiper arms 114–117 one position counter-clockwise to the next position designated number '1' for the wiper arm 114. When wiper arm 114 moves it will supply power through the appropriate leads, the closed contacts 123 of relay 122 to the '1' position on the units level of the accumulator 138. If one assumes that 37 marks have occurred in channel *b* the movable arm of the units level of the accumulator 138 will be positioned at 7 while the movable arm of the tens level of the accumulator will be positioned at 3 as shown in the drawing. Since the movable arm of the units level is positioned at 7 the current flow will be interrupted at the units level of the accumulator 138.

When the current flow is interrupted the typewriter carriage will be moved an additional space horizontally and the relay stepped to its next position. This function is achieved by designing the relay 145 to be a fast engaging slow releasing relay. Thus, sufficient time is provided during the disengaging of relay 145 to allow any character to be typed before the typewriter spaces an additional space. After relay 145 releases it will be closed again by the circuit described above and cause another pulse to be supplied to the carriage spacing solenoid on typewriter 120. Accordingly, the carriage will continue to space and the wiper arms 114–117 will continue to rotate in a counter-clockwise manner until wiper arm 114 reaches the position '7' on the level 3 of switch A. When the wiper arm 114 reaches the position 7, power will be supplied to the '7' position of the units level of the accumulator 138. Since the movable arm of the units level of the accumulator is also at the '7' position current will flow through closed contacts 125 of relay 124 to the open contacts 131 of relay 130. Since the contacts 131 are open nothing further will happen and again the solenoid 148 will continue to move the wiper arms 114–117 of the levels 3–6 of switch A in a counter-clockwise manner and space the carriage one space for each movement of the wiper arms.

The wiper arms 116 and 117 will rotate until the wiper arm 117 of level 6 is aligned with position 30. When it reaches this position power will be transmitted through the lead 174 to the relay 166 to actuate this relay. This in turn will supply power to the position '3' and '8' on the tens level of the accumulator 138. Since the movable arm of the tens level of the accumulator is aligned with the position '3' this will permit power to flow through the contacts 118 of the relay 124 to actuate the relay 130 to close the contacts 131. The system will continue to space until one of the wiper arms 114 or 115 of the levels 3 and 4 are again positioned opposite a '7' which will supply power to the 7 position of the units level of accumulator 138. Power will then flow through the closed contacts 125 of relay 124, contacts 131 and 133 to actuate the relay 142. The actuation of the relay 142 will close the contacts 143 which will supply power to the character selected on the automatic typewriter 120 for use in the graphical plotting. This actuation will cause the typewriter to type the appropriate character on the graph or record.

The solenoid 148 will continue to operate to move the wiper arms 114–117 of the levels 3–6 of switch A until the arm 117 moves to the home position. This will supply power through the lead 190 to actuate the carriage return and by a lead 192 to actuate the release solenoid 213 of relay 132. The actuation of the release solenoid of relay 132 will open the contacts 133 and thus prevent any further operation of the system until they are again closed by a pulse from the tape reader. Power will also be transmitted by means of a lead 194 to actuate the relay 163 and the relay 106 to again start the tape reading machine 53.

The tape reading machine will continue to read the tape until the relay 102 again receives 10 pulses from channel *h*. Upon receiving 10 pulses relay 102 will close to stop the tape reader and graphically plot the data accumulated from channel *b*. This procedure will continue until the end of the test data is reached at which point the tape reader will be stopped and the data accumulated from channels *b–g* recorded by the typewriter 120. The major portion of the equipment required to record the data by use of typewriter 120 is omitted from FIGURE 2 for the purpose of clarity but is shown and described in the above-referenced application.

While the system has been described and illustrated with respect to plotting data from only one channel, for the purpose of clarity, the data from the remaining channels is similarly plotted. The above-described system is merely duplicated for each additional channel to be plotted. Modification may be made in the system described in order to perform additional operations or speed up the graphical plotting. Relays could be incorporated to insure the plotting of only the most significant data where data from two or more channels is being plotted and both have the same value simultaneously.

Accordingly, this invention should not be limited to the details shown and described but only to its broad spirit and scope.

I claim as my invention:

1. A system for graphically recording information recorded in the form of machine-sensitive marks wherein the marks denote additive increments of different items of data, the data pertaining to each item of data being recorded in a separate channel comprising: means for passing the record through a record reading device including a separate accumulator for each channel on the record, each accumulator totaling the number of machine-sensitive marks occurring in each channel as the record passes through the reading machine, control means coupled to the reading device for stopping the reading device and scanning said accumulators whenever a preset number of marks are registered on a selected accumulator; said control means being coupled to a recording device to position said recording device in one direction in relation to the total number of marks accumulated on each accumulator, said control means actuating said recording device after it is positioned to graphically record on a medium the position of said recording device and said control means in addition positioning said recording device perpendicular to the one direction in response to the accumulation of the preset number of marks on said selected accumulator.

2. A system for graphically recording on an electric typewriter information recorded in the form of machine-sensitive marks wherein the marks denote additive increments of different items of data, the data pertaining to each item of data being recorded in a separate channel, said system comprising: a reading device including a separate counting means for each channel on the record, said counting means being disposed to accumulate the total machine-sensitive marks occurring in each channel; a scanning means coupled to said reading device and responsive to the accumulated total occurring in one selected channel for periodically stopping the reading device and scanning all of the channels; an electric typewriter coupled to said scanning device and disposed with its line advance responsive to the scanning means to advance the lines of said typewriter in response to the total of said one channel; said scanning means interrogating the counting means assigned to the remaining channels to ascertain the counts accumulated on each and positioning the typewriter carriage horizontally in proportion to the total accumulated on each channel and marking each horizontal position of the carriage by typing a distinctive character for each channel whereby a graphical record is prepared for the data recorded in each channel.

3. A device for graphically recording information contained on a record in the form of machine-sensitive marks disposed in parallel channels comprising: a record reading device including accumulating means disposed to indicate the total number of machine-sensitive marks on said record and first and second record advancing means; a graphical recording means coupled to said record reading device and having two degrees of movement at substantially right angles to each other, one degree of movement being controlled by said first record advancing means, said first record advancing means being responsive to the machine-sensitive marks occurring in a selected channel, said first record advancing means advancing the record on said recording means a discrete step upon the occurrence of a predetermined number of marks in said selected channel; the other degree of movement being controlled by said second record advancing means, said second record advancing means being responsive to the machine-sensitive marks occurring in one of the remaining channels, said second record advancing means advancing the record a discrete step in the other direction upon the occurrence of each machine-sensitive mark in said one remaining channel.

4. The device of claim 3 in which said second record advancing means returns the recording means to a base line each time the first record advancing means advances the record in said one direction.

5. A device for graphically recording information contained on a record in the form of machine-sensitive marks disposed in parallel channels comprising: a record reading device including accumulating means disposed to indicate the total number of machine-sensitive marks on said record in each of the parallel channels; a first switch means coupled to said record reading device and responsive to machine-sensitive marks in a selected channel to stop the record reading device upon the occurrence of a predetermined number of marks in said selected channel; a scanning means coupled to said record reading device and responsive to the stopping of the record reader to scan the accumulating means of at least one of the remaining channels an electric typewriter coupled to said record reading device said scanning means positioning the carriage of said electric typewriter in proportion to the total number of machine-sensitive marks accumulated in the remaining channel and actuating the typewriter to type a character where the carriage is positioned; a second switch means coupled to said record reading device and responsive to the scanning means to actuate the line advance on the typewriter and restart the record reading device.

References Cited in the file of this patent

UNITED STATES PATENTS

| | | |
|---|---|---|
| 2,378,371 | Tholstrup | June 12, 1945 |
| 3,049,292 | Meyers | Aug. 14, 1962 |